(12) United States Patent
Smith

(10) Patent No.: US 6,393,764 B1
(45) Date of Patent: May 28, 2002

(54) PLANTER ELEMENTS AND COMBINATIONS THEREOF

(76) Inventor: Jeffrey G. Smith, 500 Kimber Rd., Syracuse, NY (US) 13224

( * ) Notice: Subject to any disclaimer, the term of this patent is extended or adjusted under 35 U.S.C. 154(b) by 0 days.

(21) Appl. No.: 09/421,016

(22) Filed: Oct. 19, 1999

(51) Int. Cl.⁷ ............................. A01G 9/02; A01G 9/12
(52) U.S. Cl. ................................ 47/65.5; 47/70; 47/66
(58) Field of Search ................................. 47/65.7, 66.5, 47/70, 85, 86, 45, 47, 65.5, 83, 44, 66.1, 66.3, 69; 280/79.11, 79.2, 47.35, 35, 33.998; 119/247

(56) References Cited

U.S. PATENT DOCUMENTS

| | | | |
|---|---|---|---|
| 1,063,502 A | | 6/1913 | Bryan |
| 1,959,800 A | * | 5/1934 | Rogge ............................ 47/75 |
| 2,709,838 A | | 6/1955 | Zausner |
| 2,715,794 A | | 8/1955 | Atkinson |
| 2,770,919 A | * | 11/1956 | Shumaker ...................... 47/39 |
| 2,814,161 A | | 11/1957 | Hawkins |
| 2,963,819 A | | 9/1960 | D'Amato |
| 3,076,289 A | * | 2/1963 | Gallo ............................ 47/83 |
| D195,484 S | | 6/1963 | Klein |
| 3,148,479 A | | 9/1964 | Stout |
| 3,152,574 A | | 10/1964 | Luper |
| 3,166,869 A | | 1/1965 | Beckerman |
| 3,222,736 A | | 12/1965 | Beckerman |
| 3,298,133 A | | 1/1967 | Courtright |
| D209,768 S | | 1/1968 | Rasmussen |
| D232,561 S | | 8/1974 | Guiseppe |
| 3,935,671 A | * | 2/1976 | Soot ............................. 47/70 |
| 3,935,673 A | | 2/1976 | Robins |
| 4,092,802 A | | 6/1978 | Oyama |
| D272,305 S | | 1/1984 | Pahlanen |
| 4,685,246 A | * | 8/1987 | Fennell ......................... 47/66 |

(List continued on next page.)

FOREIGN PATENT DOCUMENTS

| | | | | |
|---|---|---|---|---|
| DE | 2639565 | * | 3/1978 | ................. 47/66.1 |
| EP | 89291 | * | 9/1983 | ................. 47/65.5 |
| FR | 473347 | * | 6/1915 | ................. 47/65.5 |
| FR | 2573971 | * | 6/1986 | ................. 47/65.5 |

*Primary Examiner*—Peter M. Poon
*Assistant Examiner*—Son T. Nguyen
(74) *Attorney, Agent, or Firm*—George R. McGuire; Hancock & Estabrook, LLP

(57) ABSTRACT

Planter elements for use individually or in various combinations for a wide variety of uses and which are easily assembled for compact storage/shipment. A base element is a box-like structure having four walls, open at the top and bottom. The walls are attached to posts at the four corners with upper surfaces of the posts in a common plane within the space surrounded by the walls and lower surfaces in a common plane below such space, permitting two or more of these elements to be stacked atop and releasably attached to one another, or be placed under or over other elements, as well as being optionally secured in place directly upon the ground. A similarly constructed element, termed an extension box, may be placed atop the base to increase its effective height, or may be used separately or in combination with other elements. The base and/or extension box elements may be supported upon and releasably attached to a cooperatively structured dolly element for convenient movement. An element having removable side walls, e.g., of transparent plastic or open-mesh screen and/or fabric, may be used individually, directly on the ground, or placed upon the base or extension box. A lid member, also preferably having a replaceable panel, may be placed on the base or other elements in either substantially sealed or spaced relation thereto, by turning the lid over, for different applications. A trellis structure may be employed individually or releasably attached to the base or extension box which include internal members which may be selectively positioned to support the trellis or to provide another function. The adjustable trellis offers a wide variety of configurations for physical support of plants and other devices to promote growth and protect plants.

36 Claims, 11 Drawing Sheets

U.S. PATENT DOCUMENTS

| | | | | |
|---|---|---|---|---|
| 4,839,987 A | * | 6/1989 | Cosandier | 47/70 |
| 4,914,857 A | * | 4/1990 | Dodgen | 47/47 |
| H824 H | | 10/1990 | Ghafoorzai | |
| 5,186,479 A | * | 2/1993 | Flowers | 280/47.35 |
| 5,341,595 A | | 8/1994 | Griggs et al. | |
| 5,404,839 A | * | 4/1995 | Mancuso | 119/246 |

* cited by examiner

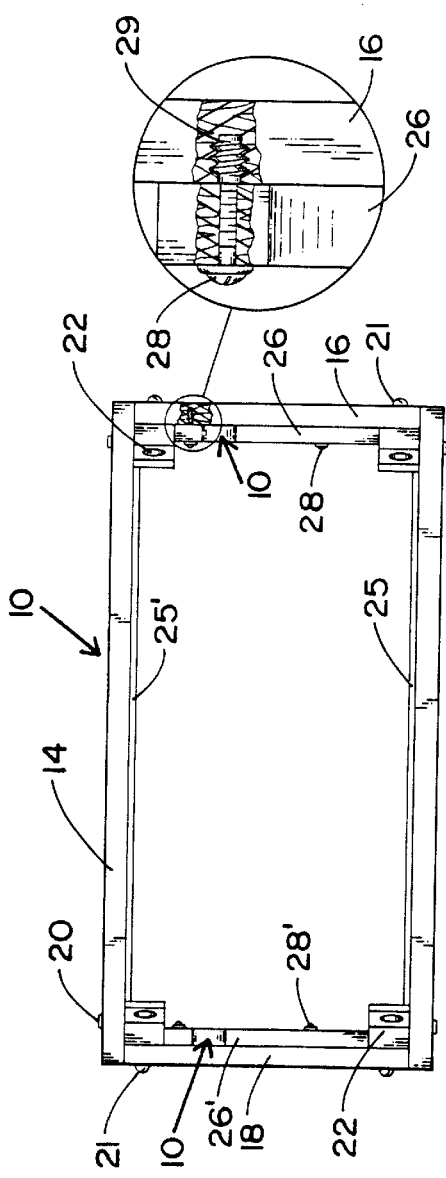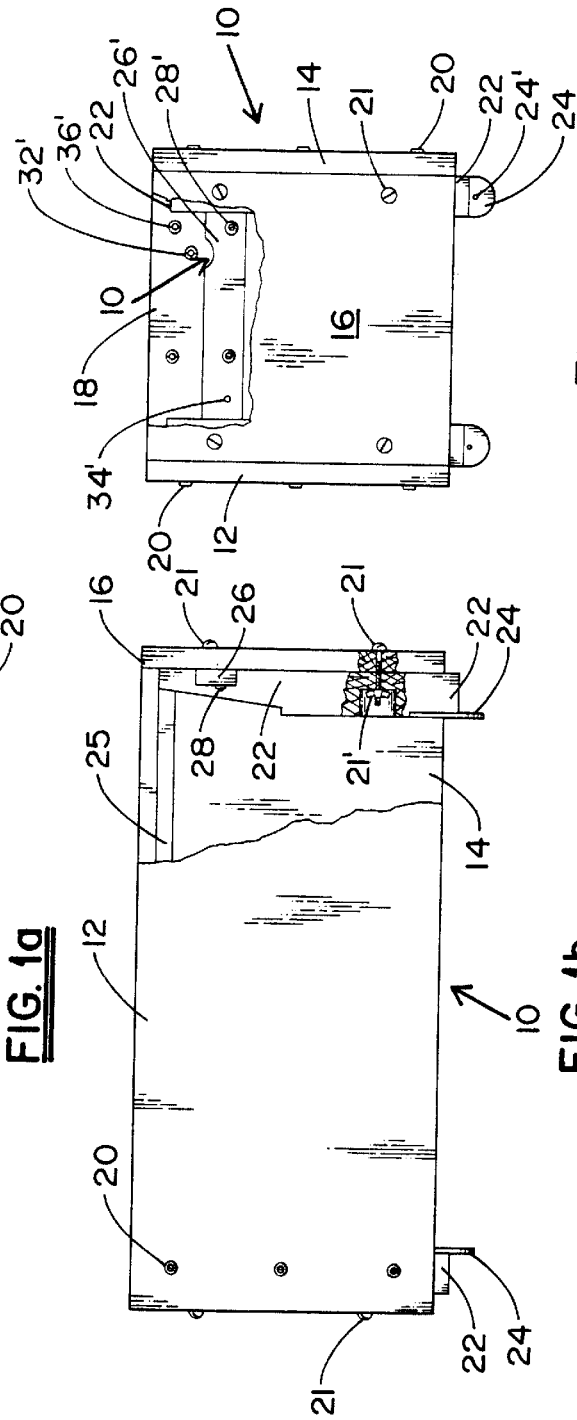

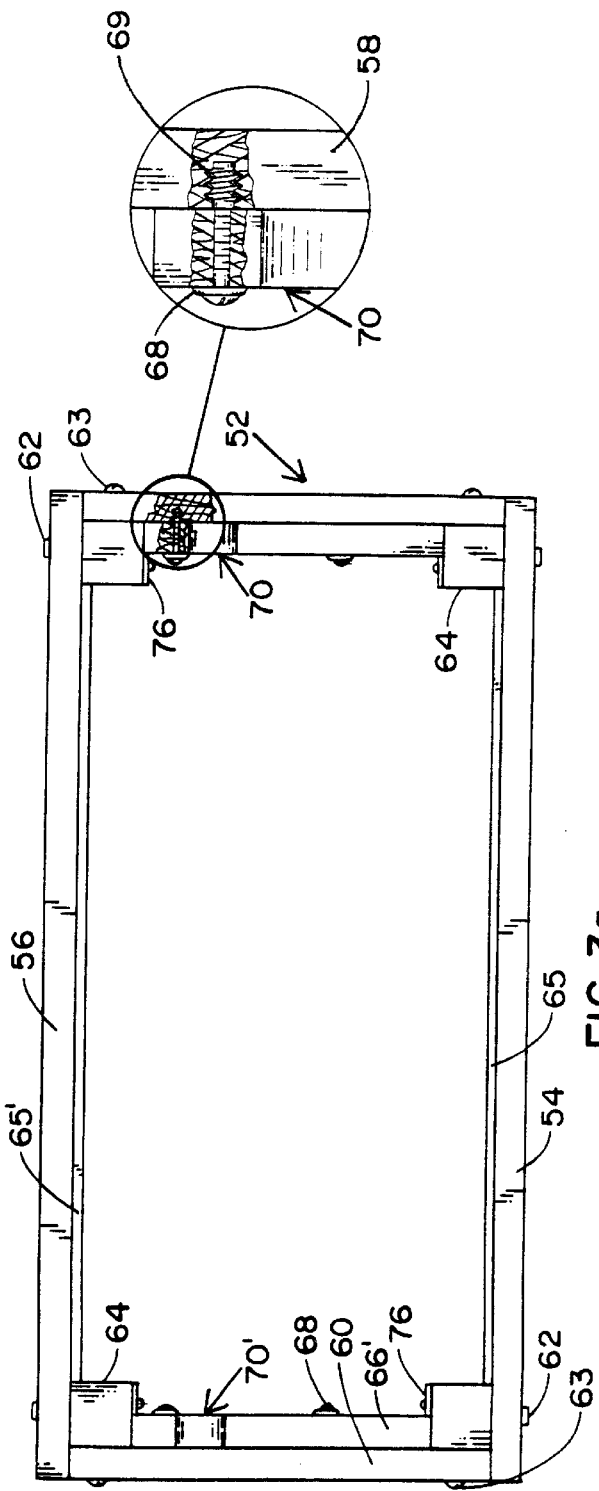
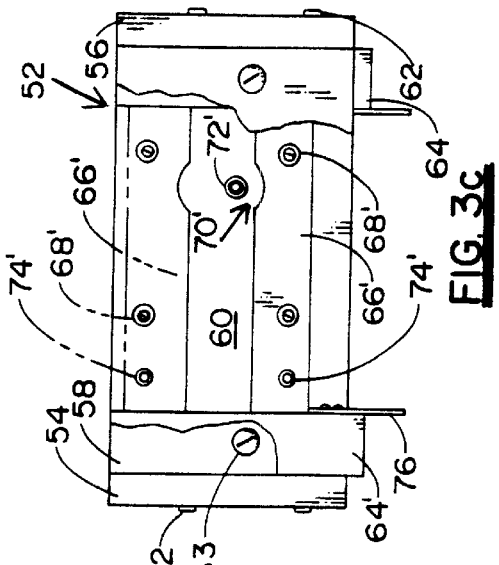
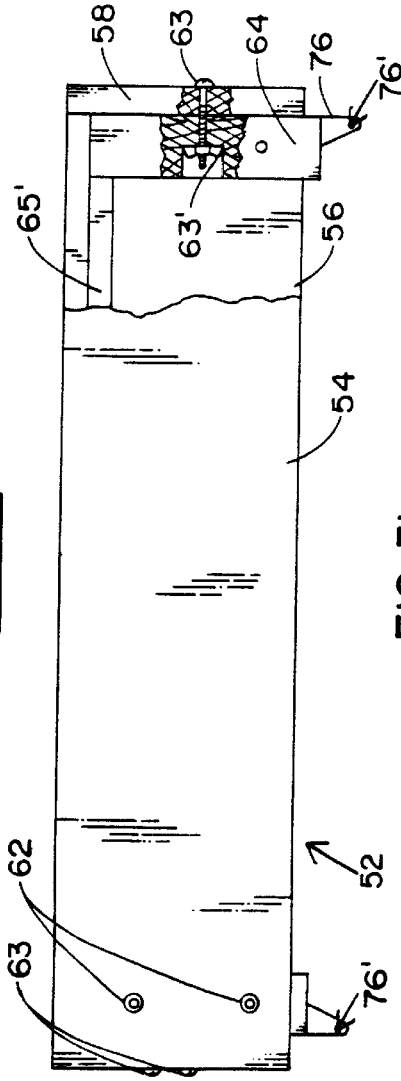
FIG. 3a
FIG. 3b
FIG. 3c

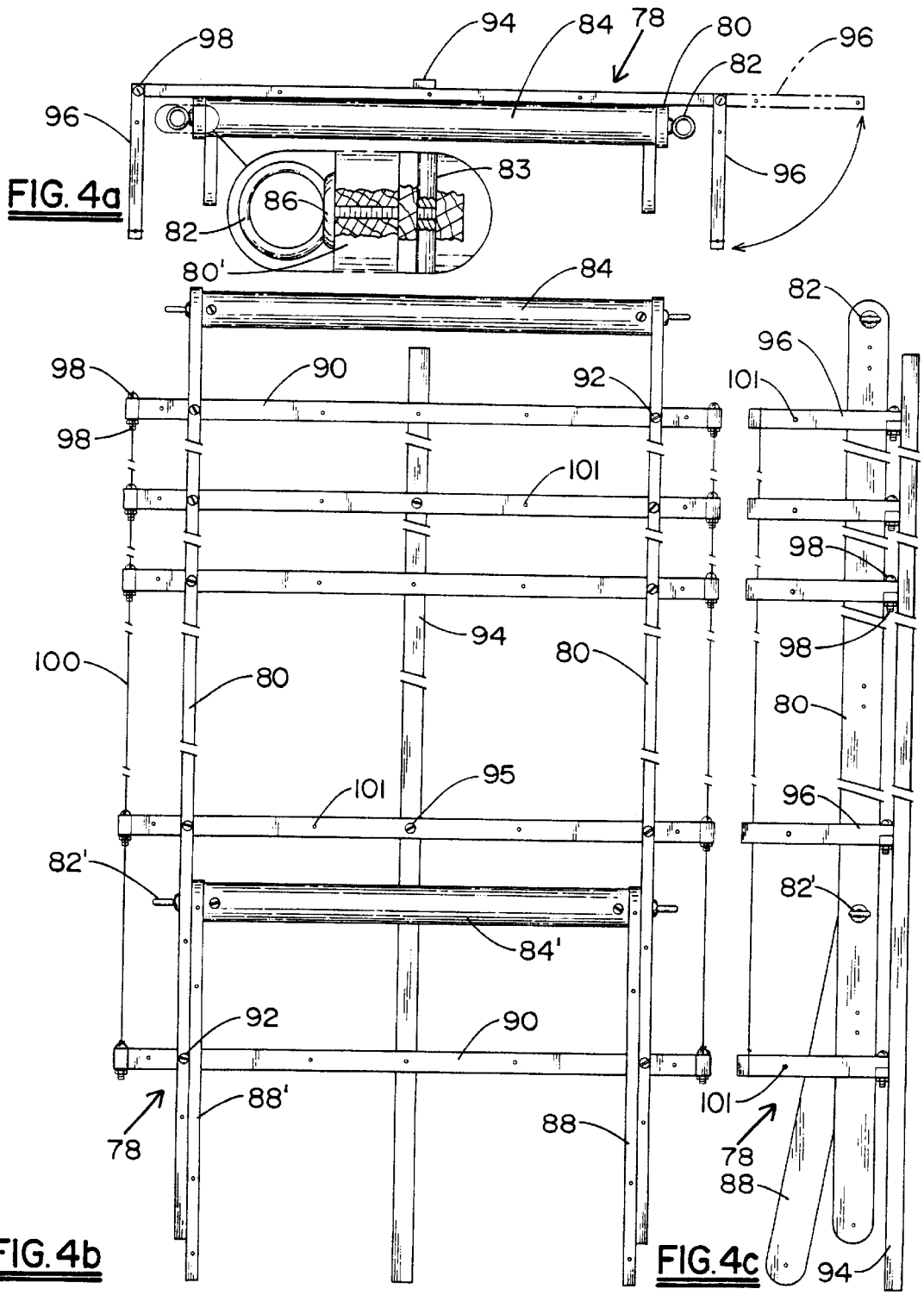

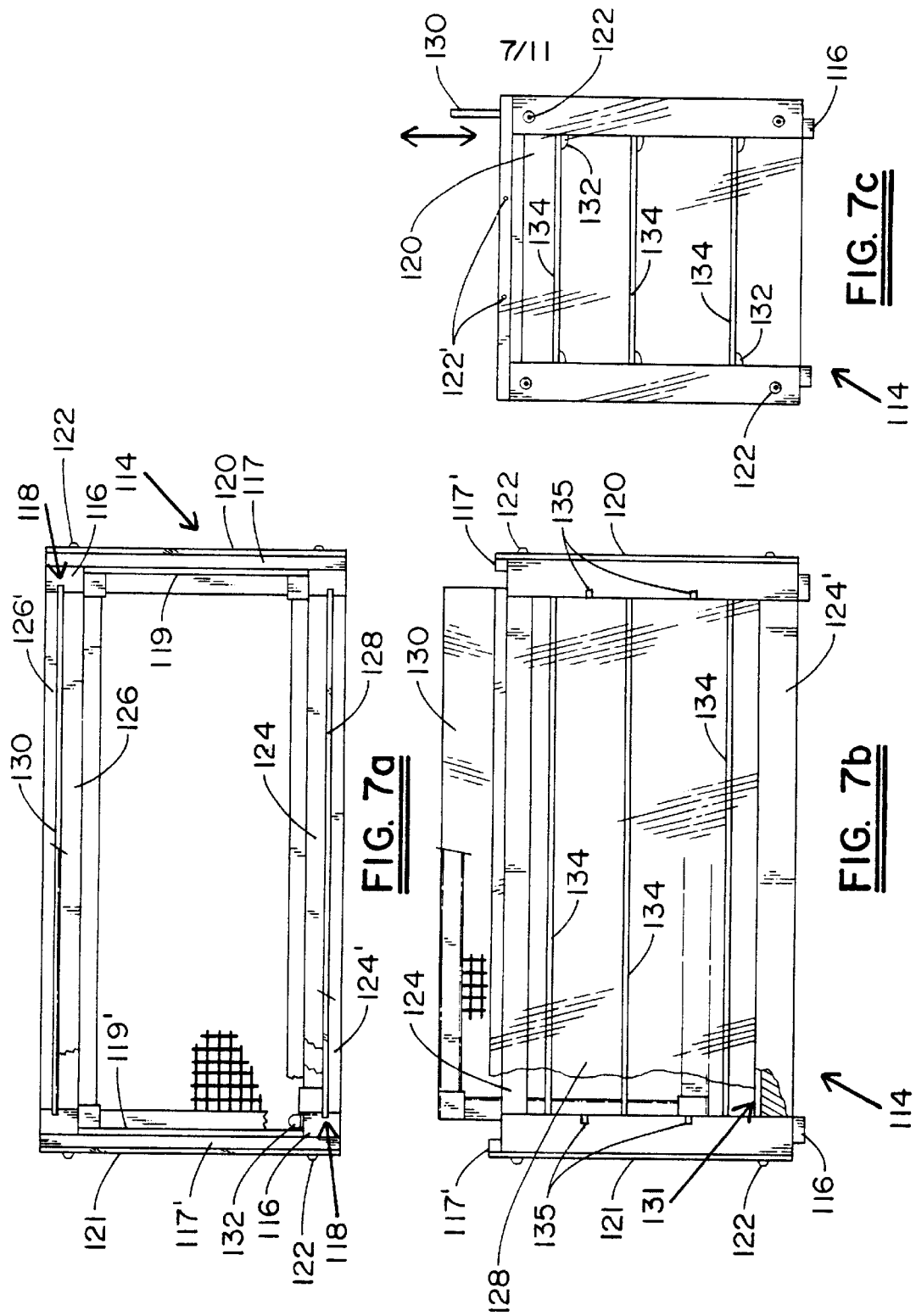

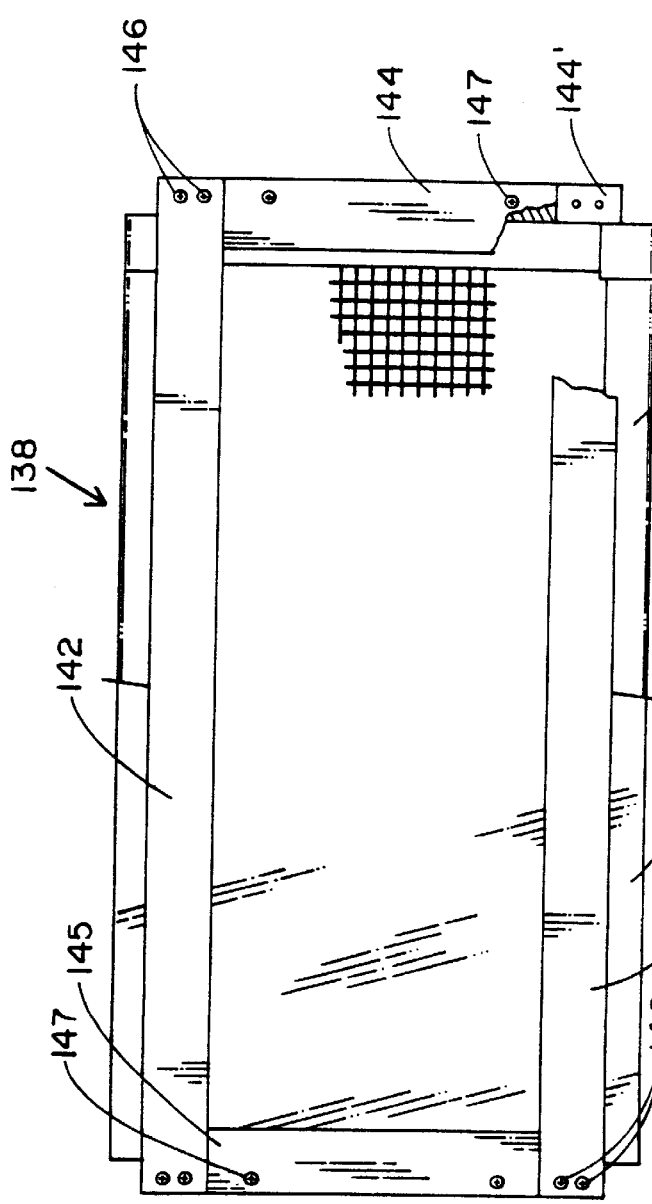
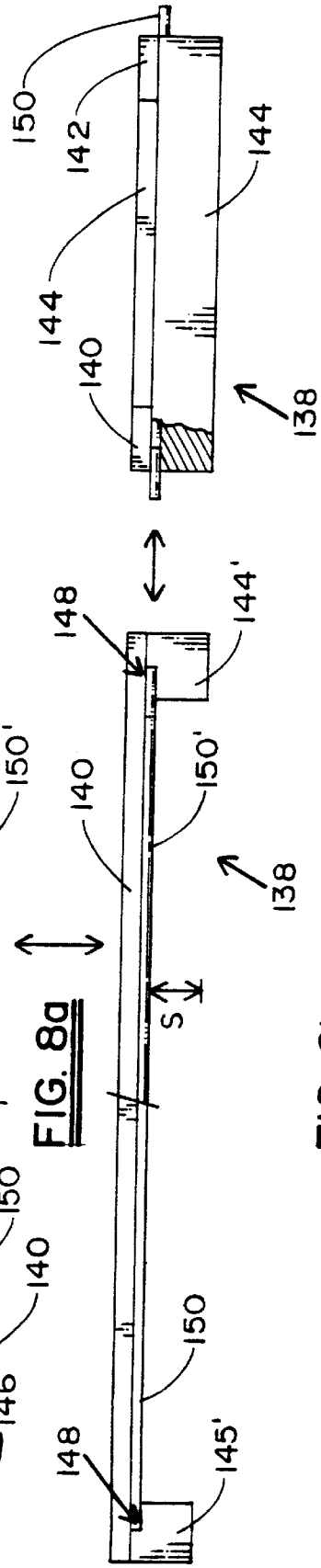
FIG. 8a
FIG. 8b
FIG. 8c

PLANTER ELEMENTS AND COMBINATIONS THEREOF

BACKGROUND OF THE INVENTION

The present invention relates to structures wherein soil may be conditioned and a wide variety of plants may be started, grown and dried over an extended season; more particularly, the invention relates to planter structures wherein a single element or module may be used individually, that is, as a stand-alone structure, or in combination with various other elements to add to the utility and versatility of the structure.

It is often desirable for a variety of reasons to plant and grow vegetables, flowers, and other growing plants in some sort of planter structure as well as directly into the ground. In some instances it may be advantageous for the planter structure to be movable from place to place, e.g., between indoor and outdoor locations, positions in and out of direct sunlight, etc. Trellis structures are often used to provide support for climbing plants, and/or as a structure for supporting lighting, shading and other devices to enhance plant growth; it is also useful to provide such structure for selective use in combination with planter structure. It is also advantageous to be able to control temperature, lighting, moisture, wind and pests and extend the growing season.

In a general sense, the object of the present invention is to provide novel and improved, highly versatile, yet simple planter structure which is quickly and readily adaptable to a variety of uses and conditions, and which may be easily disassembled for compact shipping and storage. One of the more specific objects of the invention is to provide a planter which may quickly and easily be moved from one location to another with several structural elements intact and without disturbing any plants or soil in the planter structure. Another object is to provide a trellis structure which may be selectively attached to or removed from planter elements, for use independently or in cooperation with the planter structure. A further object is to provide a planter structure which is subject to a wide variety of modification in terms of the materials enclosing, protecting and/or contributing to the growth of the contents of the planter structure, and which may also function to enclose, protect and contribute to the growth of plantings directly in the soil of a typical garden. Still another object is to provide a planter including a base and a plurality of structural elements optionally and alternatively placed into and out of cooperative relationship with the base and/or with one another to selectively modify the utility of the planter.

Other objects and advantages will be set forth and explained further at the conclusion of the following detailed description, and still others will be obvious to those skilled in the art.

SUMMARY OF THE INVENTION

The basic element of the planter structure of the present invention is a base in the nature of a box-like structure having four walls, rigidly connected by means of corner posts having upper and lower surfaces in common planes spaced slightly below the common panes of the upper and lower edges, respectively, of the four walls. The base structure is open at both the top and bottom with downwardly projecting elements attached to each of the corner posts. The base may be filled to a desired level with soil and used as a stand-alone element, with the downwardly projecting elements penetrating the underlying soil or other material to anchor the base in a fixed position. The base, as well as certain other components, may also be placed, without additional soil, over plantings in the ground or in other soil containers and be used as a cold-frame type device. The base includes internal structure for supporting other, optionally used elements in predetermined relation. If mobility of the base is desired it may be placed atop a dolly device and removably secured thereto by means of pins extending through the downwardly projecting elements on the base. The dolly includes a flat plate with cut-outs at the four corners, fitted with small wheels or casters. Cross pieces are affixed to the lower surface of the plate. When the base is placed atop the dolly, the corner posts fit into the cutouts in the dolly plate with the plate closely surrounded by the base side and end walls and the lower edges of the base side walls resting upon the cross pieces. Rope loops are attached to the cross pieces at each end for manually towing or lifting the dolly and base.

One element, in addition to the dolly, which may be selectively placed in cooperative relation with the base is an open-ended, four-sided frame, having essentially the same structure as the base, but of lesser height. This element, termed an extension box, may be placed upon and removably secured to the upper end of the planter base, thereby effectively increasing the height of, and potential soil depth within, the planter, i.e., the combined base and extension box. The extension box may also be used independently of, and in the same ways as, the base, including cooperative use with other elements. Both the planter base and extension box have internal structure by which a trellis may be optionally supported and releasably secured. Preferred forms of trellis are disclosed for independent use or for releasable attachment to either base or extension box and selective adjustment of the vertical angle of the trellis with respect thereto.

A further, optionally usable element termed a "panel frame" may be used independently or may be placed atop either a base, extension box or another panel frame. The panel frame includes four corner posts with end walls of transparent plastic or other rigid material affixed to each pair of end walls. Spacer members hold the two end walls in spaced relation and form, with the corner posts, open sides. A pair of removable panels, interchangeable with other panels of different material, may be slidingly inserted into grooves in opposed, spaced surfaces of the corner posts to form the side walls. A lid, comprising a rigid, four-sided frame surrounding a removable panel of transparent, transluscent, opaque or screen material may be placed atop any of the base, extension box or panel frame in either sealed or spaced relation thereto. The panel frame may be fitted with vertically spaced, open racks and used as a solar drying or dehydrating device. Other optional combinations of elements include,among others, artificial growing lights suspended from the trellis structure, hydroponic apparatus in the base, self-watering devices, and sheets of porous cloth for lining the base, wrapping the lid, and/or covering the trellis and plants thereon.

The foregoing and other features of construction and operation of the planter structure of the invention will be more readily understood and fully appreciated from the following detailed description, taken in conjunction with the accompanying drawings, to which reference is now made.

BRIEF DESCRIPTION OF THE DRAWINGS

FIGS. 1a, 1b and 1c are top plan, side elevational and end elevational views, respectively, of one of the elements of the planter structure with portions broken away, FIG. 1a including an enlarged detail of a circled portion;

FIGS. 3a, 3b and 3c are top plan, side elevational and end elevational views, respectively, of another of the elements, with portions broken away, FIG. 3a including an enlarged detail of a circled portion;

FIGS. 4a, 4b and 4c are top plan, front elevational and side elevational views, respectively, of a trellis element of the invention, FIG. 4a including an enlarged detail of a circled portion;

FIGS. 7a, 7b and 7c are top plan, side elevational and end elevational views, respectively, of another element, with portions broken away;

FIGS. 8a, 8b and 8c are top plan, side elevational and end elevational views, respectively, of still another element, with portions broken away;

DETAILED DESCRIPTION

Figure 2A:
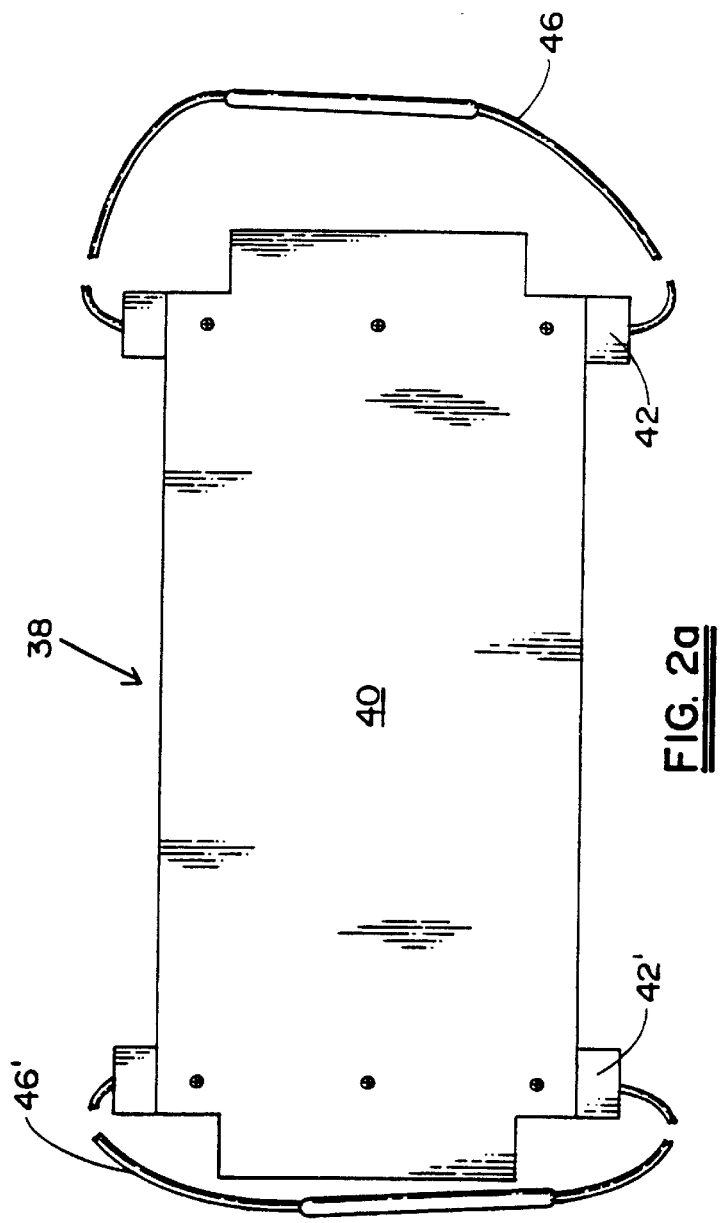
FIGS. 2a, 2b and 2c are top plan, side elevational and end elevational views, respectively, of another element of the planter structure.

In furtherance of the foregoing objects, the invention contemplates planter structure in the nature of an individual unit which may be employed alone, but which includes structural components for releasable and optional combination therewith of one or more additional elements, most or all of which may also be used alone. In the following disclosure, and in the accompanying drawings, several structural elements will be individually shown and described, followed by illustration and description of these and other elements in various cooperative structural combinations.

In FIGS. 1a–1c is shown a basic element of the planter structure of the invention, refereed to as a "base" and denoted generally by reference numeral 10. Base 10 is a four-sided structure, having rectangular side walls 12 and 14, and end walls 16 and 18, open at both the top and bottom. The walls are interconnected to form a rigid structure, preferably by screws 20 extending through side walls 12 and 14 into comer posts 22, and carriage bolts 21 extending through aligned openings in end walls 16 and 18 and the comer posts and secured by wing nuts 21' within countersunk openings in the comer posts for ease of assembly and disassembly of base 10 for shipment or storage. Comer posts 22 extend downwardly to lower surfaces in a common plane about ½" below the common plane of the lower edges of the four walls. A plastic or metal clip 24 is affixed to and extends downwardly from each of comer posts 22. In the illustrated form, clips 24 are rounded at their lower ends and have a through opening 24', for purposes described later, although they may, of course, take other forms including that of an elongated blade or stake. Seal strips 25, 25' are affixed to the inner surfaces of side walls 12 and 14, extending between comer posts 22, with upper surfaces of the seal strips in the common plane of the upper surfaces of the comer posts, a short distance below the common plane of the upper edges of the side and end walls, for purposes explained later. Brackets 26, 26' are removably attached to the inner surfaces of end walls 16 and 18, respectively, by machine screws 28, 28', extending through openings in the brackets and into threaded inserts 29 (see FIG. 1a detail) in the end walls. Brackets 26, 26' have curved notches 30, 30', respsectively, in the side which faces upwardly in the orientation of FIGS. 1a–1c. Threaded insert 32 in end wall 18 (FIG. 1c) is positioned above notch 30' and an identically positioned insert (not shown) is positioned in end wall 16. Brackets 26, 26' each have a threaded insert near the ends opposite notches 30, 30' and approximately in horizontal alignment with screws 28, 28'. Such an insert 34' is shown in FIG. 1c in bracket 26' and an identically placed insert (not shown) is provided in bracket 26. A pair of threaded inserts 36' in end wall 18 are aligned parallel to the upper edge of the end wall; a pair of identically placed inserts (not shown) are provided in end wall 16. Brackets 26, 26' may be removed from their respective connections with end walls 16 and 18 by removing screws 28, 28' and turned over, i.e., positioned with notches 30, 30' facing downwardly, and reattached by threading screws 28, 28' into inserts 36, 36'. When so repositioned, the edges of brackets 26, 26' opposite the edges having notches 30, 30' are in the common plane of the upper surfaces of comer posts 22 and sealing strips 25, 25' to perform a function described later.

Base 10 may, if desired, be used as an individual, standalone structure or, as described later, may be releasably attached to and used with one or more other, optionally employed structural elements. When used alone, base 10 may be placed upon an outdoor surface, presumably tillable soil, sand, or other relatively easily permeable material, with clips 24 extending into the underlying material to provide an anchoring means, holding base 10 in place. Where greater anchoring capability is desired, clips or extensions of the aforementioned, more elongated form may be employed. If the underlying surface is essentially impenetrable, clips 24 may be removed. Base 10 is placed in a desired location, directly upon soil or other supporting surface, and fully or partially filled with topsoil or other media, or used in the nature of a cold frame without placing additional material in the base. Alternatively to their anchoring function, clips 24 may be used to interconnect base 10 with underlying structure and brackets 26, 26' may be used to support trellis structure, as will now be explained.

Figure 2B:
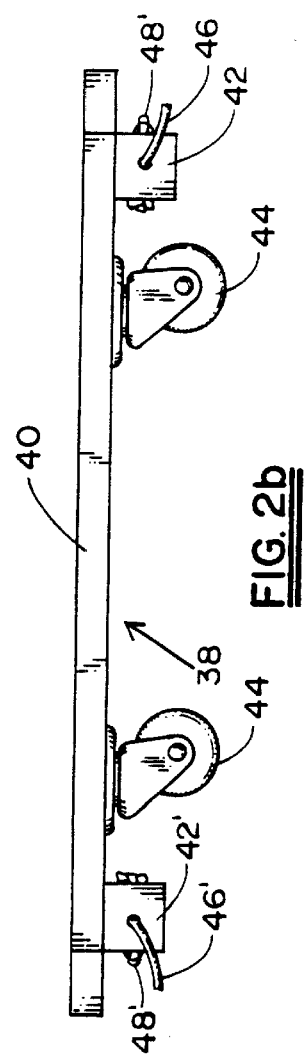
Figure 2C:
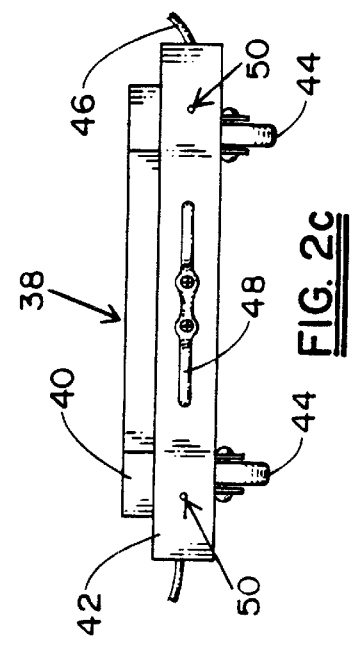

Structure for rendering base 10 portable is shown in FIGS. 2a–2c. This structure is termed a "dolly" and denoted generally by reference numeral 38. Dolly 38 includes planar plate 40, having cross bars 42, 42' and four casters 44 affixed to the lower surface thereof. Cords or light ropes 46, 46' extend from opposite ends of cross bars 42, 42', respectively, and cleats 48, 48' are mounted to the outer surfaces of the cross bars for storage of the ropes when not in use. A pair of spaced openings 50 in cross bar 42, and an identically placed pair of openings (not shown) in cross bar 42', are provided for pins which extend through the previously mentioned openings 24' in clips 24 when base 10 is mounted upon dolly 38, as described later.

The planter element shown in FIGS. 3a–3c is termed an "extension box" and denoted generally by reference numeral 52. Like base 10, extension box 52 is a four-sided structure, open at the top and bottom, having rectangular side walls 54, 56 and rectangular end walls 58, 60. As in the case of base 10, the side walls of extension box 52 are connected by screws 62 to corner posts 64, and the end walls are connected by carriage bolts 63 extending through openings in the end walls and corner posts and secured by wing nuts 63' in countersunk openings in the corner posts (FIG. 3b). Sealing strips 65, 65' are affixed to side walls 54 and 56, respectively, and extend between pairs of corner posts 64 with the upper surfaces of strips 65, 65' in the common plane of the upper surfaces of corner posts 64. Bracket 66 is removably affixed by machine screws 68 passing through openings in bracket 66 engaged in threaded inserts 69(see FIG. 3a detail) in the inner surface of end wall 58, and bracket 66' is likewise affixed by screws 68' extending into threaded inserts in the inner surface of end wall 60. Curved notch 70' in bracket 66' lies just below threaded insert 72' in end wall 60, as seen in FIG. 3c, and notch 70 in bracket 66 lies below an identically placed threaded insert (not shown) in end wall 58. Brackets 66 and 66' are identical to one another and to brackets 26 and 26'. Bracket 66' includes threaded insert 74', approximately on a line passing through screws 68', and bracket 66 includes an identically placed insert (not shown). As explained in connection with screws 28, 28' and brackets 26, 26' of base 10, screws 68, 68' may be removed and brackets 66, 66' turned over and reattached to end walls 58, 60, respectively, by inserting screws 68, 68' into appropriately positioned threaded inserts in end wall 60 and an identically placed pair of inserts in end wall 58. Bracket 66' is then in the position shown in phantom lines in FIG. 3c and bracket 66 is identically positioned on end wall 58. The longitudinal edges opposite the edges containing notches 70, 70' are in the common plane of the upper surfaces of corner posts 64 and sealing strips 65, 65'. A metal or plastic clip 76 is affixed to each of corner posts 64, and the four clips, each of which has a through opening 76', extend downwardly from the lower ends of corner posts 64. As seen in FIG. 3c, corner posts 64 also extend downwardly below the common plane of the lower edges of walls 54, 56, 58 and 60. Clips 76 serve for extension box 52 the same functions as clips 24 in the case of base 10, i.e., to interconnect extension box 52 with underlying structure of base 10 or dolly 38, as shown later, or to anchor the extension box in soil or other underlying, penetrable material.

Turning now to FIGS. 4a–4c, details of a first embodiment of trellis structure 78 are shown. Trellis 78 includes a pair of elongated, upright members 80, 80' each of which is curved at both ends, as best seen in FIG. 4c. A plurality of spaced opening extend through upright members 80 and 80', including openings near each of the curved ends. Eye bolts 82 extend through the openings adjacent the upper ends of members 80, 80' and into threaded openings extending laterally through barrel bolts 83 in a tubular spacer member 84, preferably with washers 86 (FIG. 4a detail) between the bolt heads and upright members (see FIG. 4a detail). A second spacer member 84' is supported by eye bolts 82' between members 80,80' at a position closer to the lower than to the upper ends thereof. Bolts 82' also serve as pivotal mountings for brace members 88, 88'. A plurality of cross pieces 90 are attached to members 80, 80' by machine screws 92 passing through openings in the upright members and cross pieces and secured by nuts. Intermediate cross pieces(s) 94 is affixed to cross pieces 90, at one or more locations parallel to upright members 80, 80', by machines screws 95 and nuts. The number of cross pieces 90 and spacing thereof, i.e., the choice of how many and which of the preformed openings in upright members 80, 80' and screws 92 are employed for attaching cross pieces, may be varied as desired. Cross pieces 90 are notched at their terminal ends, which are positioned outwardly of members 80, 80', for pivotal attachment of similarly notched ends of end pieces 96 by means of bolts and nuts 98. End pieces 96 may be selectively rotated 90 degrees about bolts 98 between positions wherein the end pieces extend perpendicularly from cross pieces 90 and positions wherein the end pieces extend linearly outwardly from the cross pieces, as shown in solid and phantom lines, respectively, in FIG. 4a. Positioning end pieces 96 perpendicular to cross pieces 90 provides optimal growing area within the vertical extension of the soil surface. String or wire 100 may be looped around or passed through openings provided for such purpose in cross pieces 90 and end pieces 96 as desired to provide support for climbing plants when trellis 78 is combined with other elements of the planter structure in a manner described later. Support for heavier plants and vines may be provided by rigid cross piece 94 and, if desired, by additional cross pieces secured to cross pieces 90 and/or end pieces 96 by screws (not shown) passing through openings 101 and secured by nuts. The trellis components may be easily disassembled for storage and shipment and thereafter reassembled.

Figure 5:
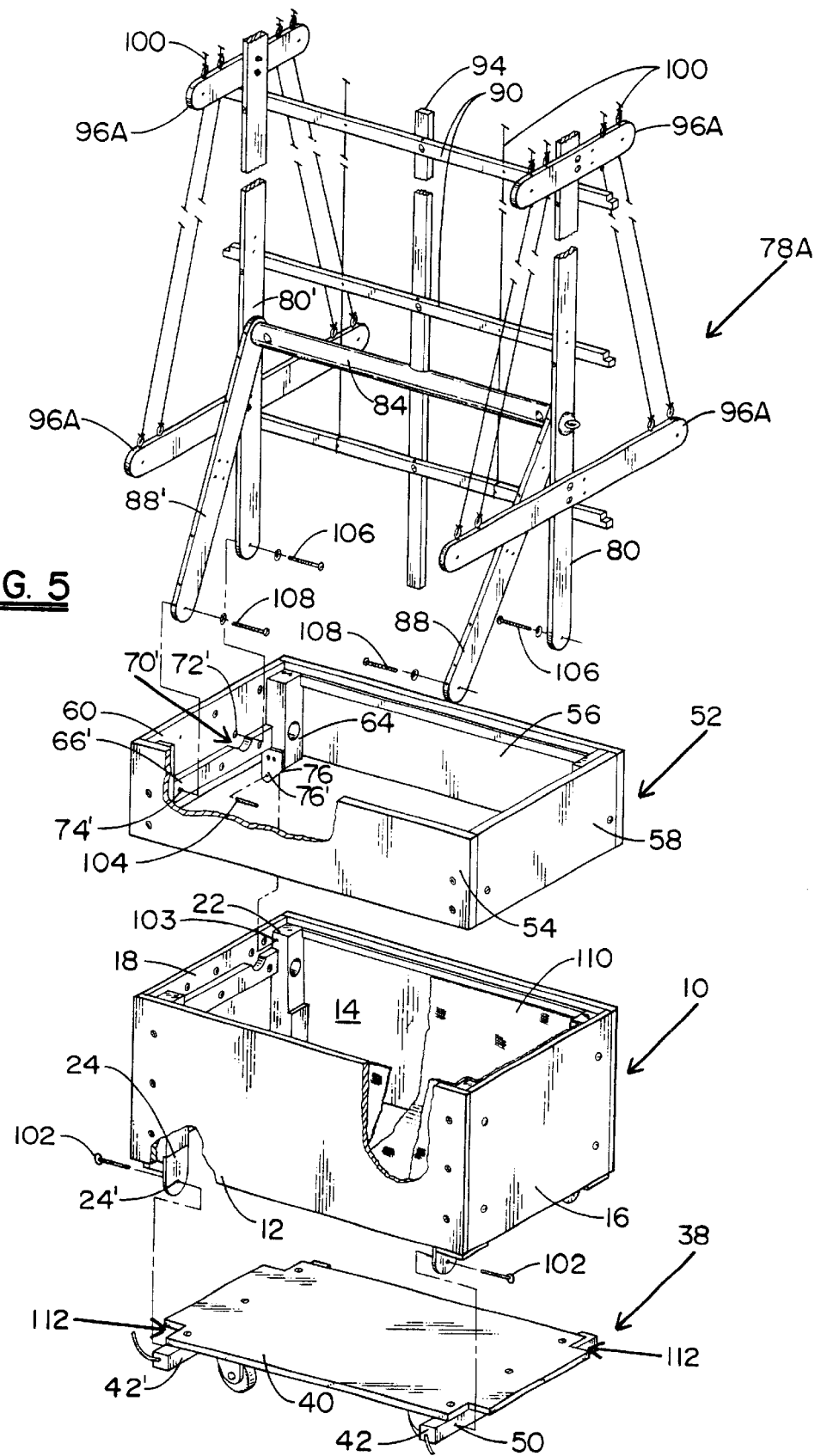
FIG. 5 is an exploded perspective view showing the four elements of the planter structure of the previous Figures in cooperative relation, with portions broken away.

The manner of optional interconnection of the four elements described separately in the foregoing paragraphs is illustrated in FIG. 5. Base 10 is placed atop dolly 38 with openings 24' in clips 24 aligned with openings 50 in crossbar 42 and the corresponding openings in crossbar 42'. Pins 102 are inserted through each of the aligned openings at the four corners, thereby connecting base 10 and dolly 38. When extension box 52 is placed atop base 10, openings 76' in clips 76 are aligned with openings in corner posts 22 and pins are inserted through the aligned openings to interconnect the extension box and base; one such opening and pin, numbered 103 and 104, respectively, are seen in FIG. 5, the other three openings and pins being identically positioned at the other corners. The term "pins" is used generically to include threaded as well as the illustrated non-threaded fasteners. Trellis 78A is similar in construction to trellis 78, and like reference numerals are used to denote parts which are the same in both embodiments. However, end pieces 96 are eliminated and replaced by T-bars 96A, affixed directly to upright members 80 and 80' and extending both forwardly and rearwardly therefrom. Trellis 78 (or 78A) is releasably attached to extension box 52 by placing the curved, lower ends of upright members 80, 80' in curved notches 70, 70', respectively, and inserting machine screws 106 through the openings nearest the lower ends of upright members 80, 80' and into insert 72' in end wall 60 and the corresponding insert in end wall 58. The opening nearest the lower end of brace 88' is placed in alignment with insert 74' in bracket 66' and the opening nearest the lower end of brace 88 is aligned with the corresponding threaded insert in bracket 66. Machine screws 108 are inserted through the aligned openings in the upright trellis members and the threaded inserts in the brackets, thereby interconnecting trellis 78/78A and extension box 52. It will be noted that trellis 78/78A may be mounted directly to base 10 in exactly the same manner in applications where extension box 52 is not required. Also, the trellis may be attached to the extension box with the latter placed directly upon the ground or other surface, without base 10, if desired.

Also shown in FIG. 5 is a fragment of liner 110, preferably a sheet of black, porous material known as landscape cloth, which may optionally be provided in base 10 (and/or extension box 52). When base 10 is placed upon dolly 38, the lower ends of corner posts 22 extend into notches 112 at the four corners of plate 40 and the lower edges of side walls 12 and 14 rest upon cross bars 42, 42', respectively. Although plate 40 in effect forms a lower wall for base 10, dimensions are such that walls 12, 14, 16, and 18 are spaced slightly outwardly of the periphery of plate 40, thus providing excellent, uniform drainage about the entire lower end of base 10. Liner 110 is placed within base 10 prior to placing soil therein to ensure that soil does not escape. It may further be desirable in indoor applications to use a non-porous liner, or to place the dolly on a plastic tray (not shown) to receive any excess moisture which may drain out of the planter structure.

Figure 6:
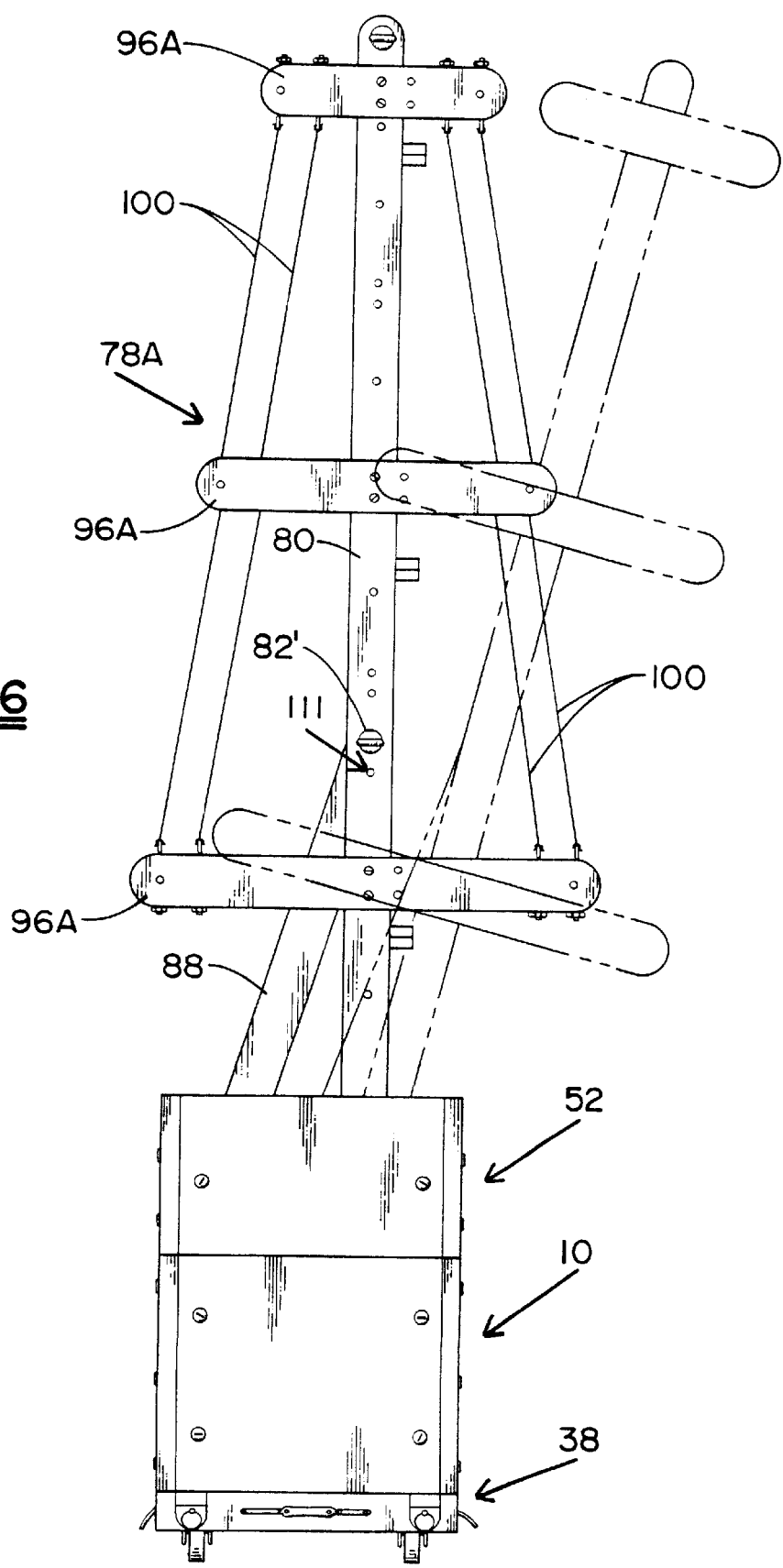
FIG. 6 is an end elevational view of the elements of FIG. 5 with a second embodiment of the trellis structure shown in two positions of angular adjustment of vertical.

The adjustability of trellis 78A (and likewise trellis 78) with respect to extension box 52 and/or base 10 is illustrated in FIG. 6. Eye bolts 82' are removed to release the connection between braces 88, 88' and upright members 80, 80' and permit rotation of the elements to the position shown in phantom lines. Eye bolts 82' are then reinserted through openings 111 in upright members 80, 80' (one of which is seen in FIG. 6) with which the openings nearest the upper ends of braces 88, 88' and spacer member 84' have been aligned. Such adjustment of the trellis is advantageous in orienting plants climbing on the trellis with respect to the sun. It will also be noted from FIG. 6 that the three illustrated T-bars 96A decrease in length from lowest to highest. This offers the advantage of strings 100 being arranged in a configuration converging toward the top, as viewed from the side, providing a more compact arrangement of plants climbing up both the front and rear of the trellis and strings attached thereto, as well as better orientation to early and late season sun, and acting as a support frame for fabric covering to control temperature, moisture, wind and pests. Preferably, the lowest of the T-bars is the same length as braces 88, 88' and sealer strips and sealer strips 25, 25' and is interchangeable therewith.

Additional elements for enhancing versatility of the planter structure are shown in FIGS. 7 and 8. The element of FIGS. 7a–7c, termed a "panel frame" and denoted generally by reference numeral 114, is a four-walled structure, open at the top and bottom, in the nature of base 10 and extension box 52. Panel frame 114 includes corner posts 116, each having an open slot 118 in the surface facing the longer sides of the frame. Sealing strips 119, 119' are affixed to the lower sides of end spacer bars 117, 117' and extend between opposing surfaces of the corner posts at each end with the upper surfaces of sealing strips 119, 119' in the common plane of the upper surfaces of corner posts 116. Pairs of corner posts 116 are also connected to one another along the longer side of the frame by upper and lower spacer members 124, 124', respectively, on one side, and by upper and lower spacer members 126, 126' on the other side. End spacer bars 117 and 117' extend across opposite ends of the frame, affixed to end walls 120, 121 by small, countersunk screws 122'. End walls 120, 121 are connected to corner posts 116, preferably by machine screws 122 passing through aligned openings in the end walls and corner posts and into barrel bolt anchors in spacer members 124, 124', 126 and 126' for ease of assembly and disassembly. Thus, by removal and replacement of screws 122, 122' the material of end walls 120, 121 may be changed as desired, e.g., from transparent, rigid plastic to other rigid material. Side walls of panel frame 114 are provided by panels 128, 130 which may be slidingly inserted and removed from slots 118, thereby providing the option of changing the material of the side walls either to be the same as or different from the material of end walls 120, 121. Upwardly facing slot 131 (FIG. 7b) is provided in lower side spacer member 124' (and an identical slot in member 126') to receive the lower edge of panel 128 (and 130); when fully inserted, the upper edges of panel 128 and 130 are in a common plane with the upper edges of end walls 120, 121 and upper surfaces of spacer bars 117, 117'. As in the case of base 10 and extension box 52, the lower ends of corner posts 116 extend below the common plane of the lower edges of end walls 120, 121 and lower spacer members 124', 126', although in the case of panel frame 114 only inner portions of the corner posts extend downwardly as may be seen from FIGS. 7b and 7c. Support brackets 132 are affixed to opposing surfaces of corner posts 116 at several vertically spaced positions to support panels 134 of open mesh screen, preferably of the same material and dimensions as screen panels used for panels 128, 130, for purposes explained later. Alternatively, support panels 134 may be supported by sliding insertion in notches 135 in corner posts 116.

The element of FIGS. 8a–8c is termed a "lid" and denoted by reference numeral 138. Lid 138 includes side frame members 140, 142 and upper and lower end frame members 144, 144', respectively, at one end and 145, 145' at the other end. Side frame members 140, 142 are affixed by screws 146 to each of lower end frame members 144', 145' and upper end frame members 144, 145 are affixed by screws 147 to lower end frame members 144', 145'. Lower end frame members 144' 145' are notched at 148 to provide channels for sliding insertion and removal of a lid panel, of the same dimensions and choice of materials as panels 128, 130. The illustrated lid panel is shown at left and right sides of FIGS. 8a and 8b as being of rigid, transparent plastic and open-mesh screen, denoted by reference numerals 150 and 150', respectively, although the actual panel would, more commonly, be of one material or the other, as in the case of panels 128, 130, or possibly wrapped with fabric. It will be noted that the upper surfaces of side frame members 140, 142 and upper end frame members 144, 145 provide a continuous surface in a common plane, whereas there is a space, denoted by the letter "s" in FIG. 8b, between the planes of the lower sides of panel 150, 150' and of lower end frame members 144', 145'. This relationship permits use of lid 138 in either of two different applications, as will now be explained.

Figure 9:
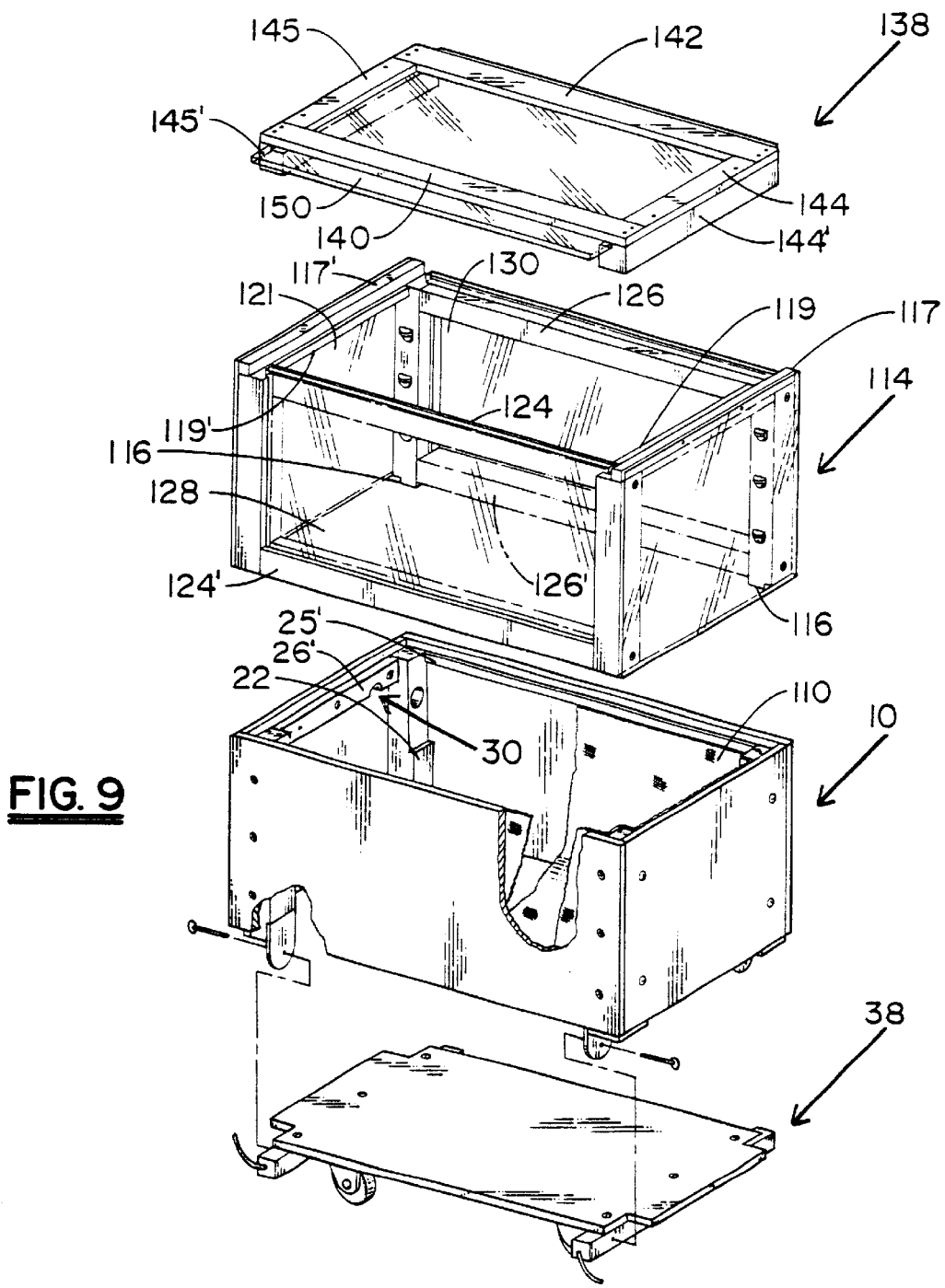
FIG. 9 is an exploded perspective view, with portions broken away, of another cooperative combination of elements.

Panel frame 114 and lid 138 are shown in FIG. 9 in a typical application wherein base 10 is mounted upon dolly 38 as previously described and lined with landscape cloth 110. In the illustrated application, both side walls 128 and 130 of panel frame 114, as well as panel 150 of lid 138, are of transparent plastic. Panel frame 114 is placed atop base 10 with the inner portions of lower ends of corner posts 116 extending into the base and the outer portions of corner posts 116, the lower edges of end walls 120 and 121, and the lower surfaces of lower spacer members 124' and 126' resting upon the upper edges of base walls 12, 14, 16 and 18. It will be noted that bracket 26' has been inverted from its FIG. 1c position and reattached, using threaded inserts 36 (as has bracket 26, not seen in FIG. 9), thereby providing a surface (the combined upper surfaces of corner posts 22, sealing strips 25, 25' and brackets 26, 26') about the inner periphery of base 10 in a plane parallel to and a short distance below the common plane of the upper edges of walls 12, 14, 16 and 18. Lid 138 is placed upon panel frame 114 with lower end frame members 144', 145' resting upon the upper surfaces of corner posts 116, sealing strips 119, 119', and upper spacer members 124, 126, between end spacer bars 117, 117', thus providing a space for air circulation between the upper edges of panels 128, 130 and the lower surface of panel 150. If desired, lid 138 may be inverted before being placed upon panel frame 114, in which case the common plane surfaces of frame members 140, 142, 144 and 145 (which are the upper surfaces in the orientation of FIG. 9) will become the lower surfaces and will rest upon the common plane upper surfaces of side spacer members 124, 126, sealing strips 119, 119' and corner posts 116, thus placing panel frame 114 and lid 138 in essentially sealed relation. Further sealing relation is provided by the surface of panel member 150 contacting the upper edges of side walls 128, 130 and the vertical surfaces of end frame members 144, 145 contacting the opposed, vertical surfaces of end spacer members 117, 117'. Dolly cords 46, 46' may be passed over the top of panel frame 114 and/or lid 138 to prevent these elements from being tipped off base 10.

Figure 10:
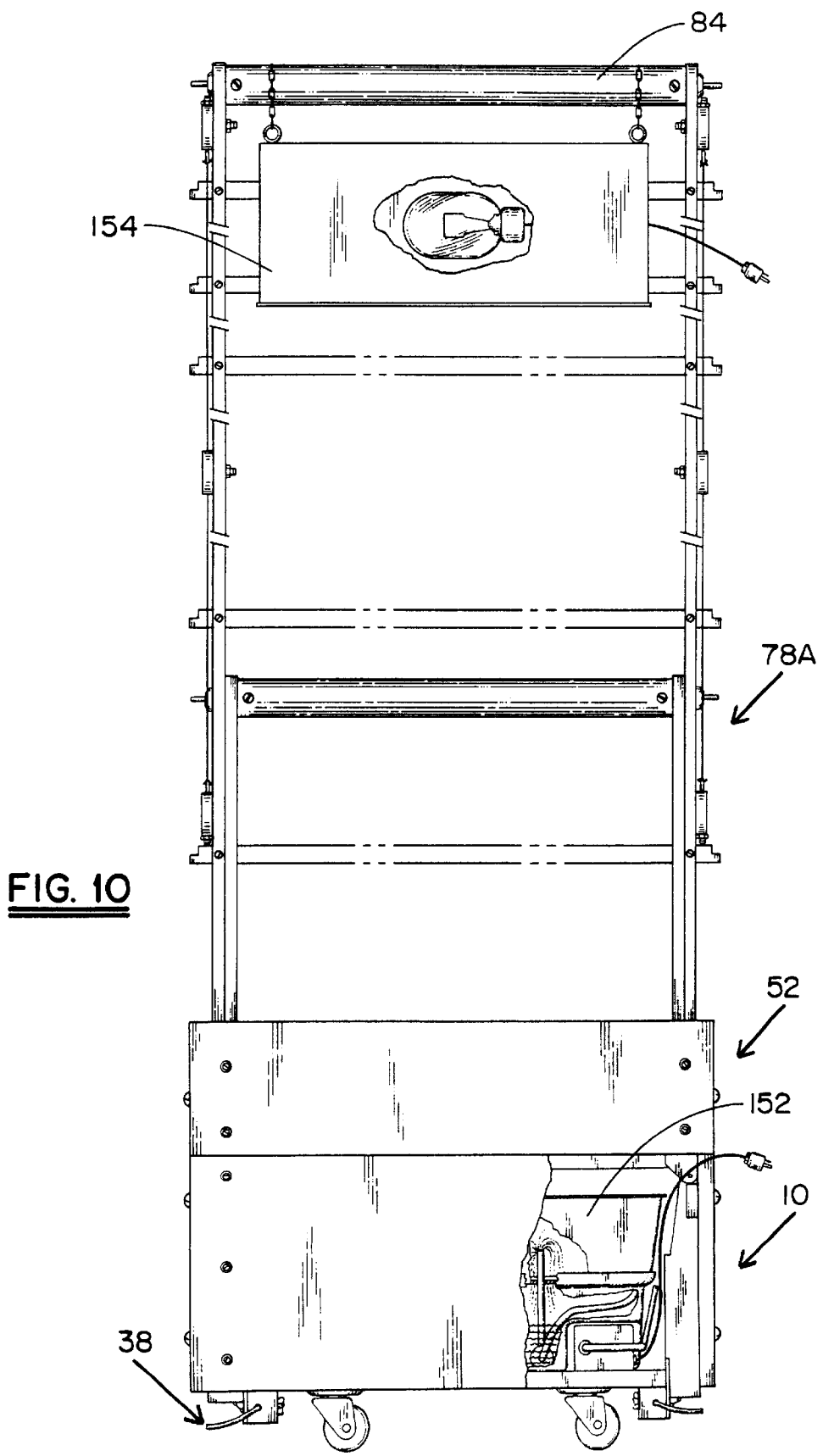
FIGS. 10 and 11 are front elevational views, with portions broken away, of examples of possible applications of certain of the structural elements previously describe in combination with other elements.
Figure 11:
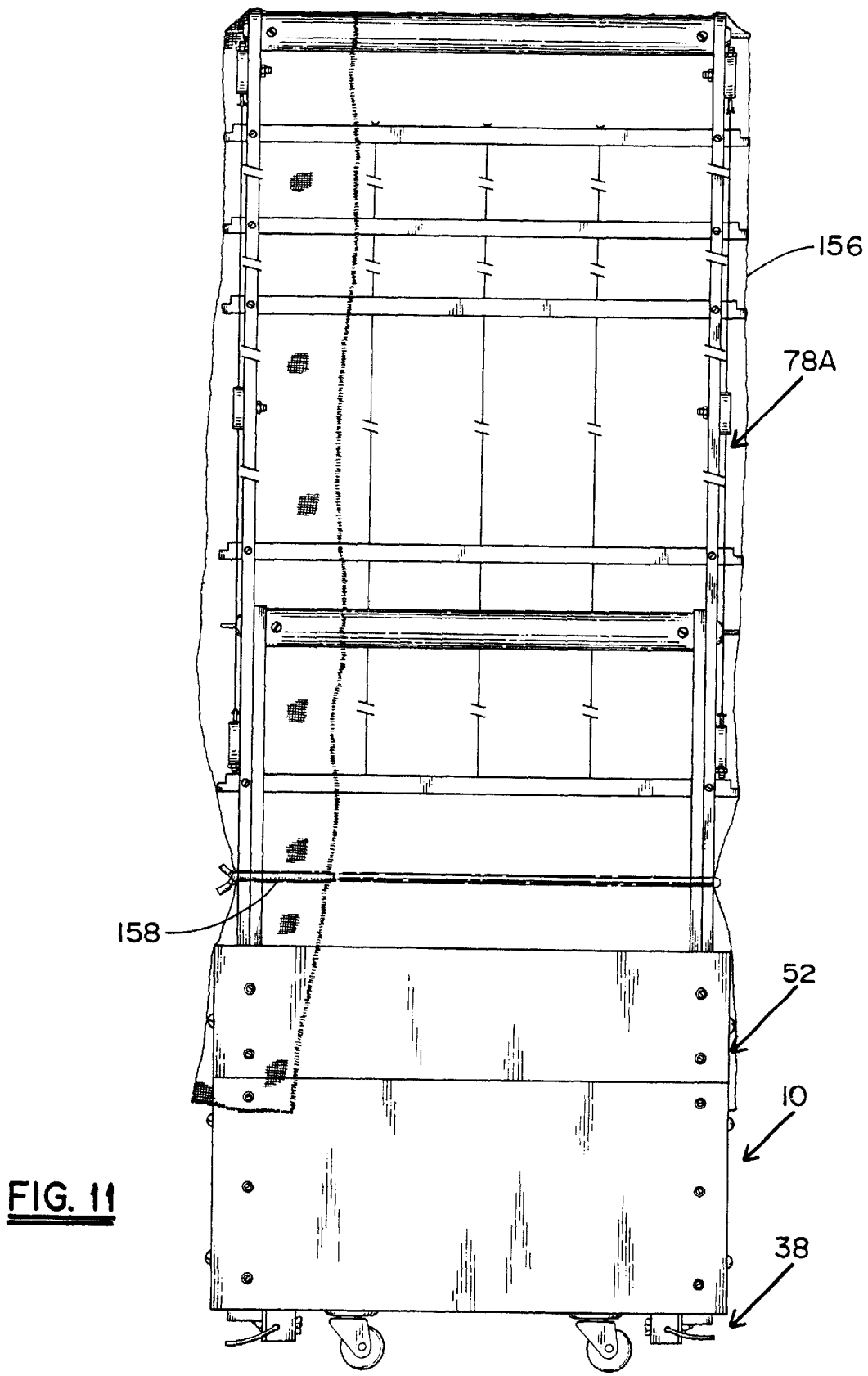

Combinations of certain of the previously described elements, together with other, optional elements, are shown in FIGS. 10 and 11. Conventional hydroponic tub unit 152 has been placed within base 10 in the application of FIG. 10, to permit growing by that method. Base 10 is mounted upon dolly 38, extension box 52 is mounted upon base 10 and trellis 78A (or 78) is mounted upon extension box 52, all as previously described. Light fixture 154, providing artificial light for the growing process, is suspended from upper spacer member 84 of trellis 78A. Fluorescent or other types of lighting and other accessories may be suspended from the variety of crossbars and end bars available for the trellis. In FIG. 11, the dolly, base, extension box and trellis are cooperatively mounted as before and cover 156, of landscape cloth, for example, has been placed over the trellis and any plants growing thereon, and secured near its lower end by cord 158 which may, if desired, be elastic.

From the foregoing it is apparent that the planter structure of the invention provides a plurality of elements which may be employed individually or in various combinations to achieve a wide variety of horticultural applications. The base and extension box are of quite similar construction, the latter being shorter in height and positionable upon the former to increase the potential soil depth. Either may be used individually, positioned directly upon any available underlying surface, with the clips extending downwardly from the four corners assisting in stabilizing the position of the elements when such underlying surface is soil or other penetrable material. The base may be mounted directly atop and releasably affixed to the dolly in cooperative structural relationship thereto. The unique trellis structure may be used individually, with the lower ends of the upright members and braces simply inserted into the underlying soil, or may be releasably attached to either the base or extension box, thereby becoming an integral part of the planter structure. The panel frame and lid provide additional options of changing the material of certain walls, e.g., between transparent plastic and open mesh screen, or fabric wrapped screen, when employing these elements to perform different functions. The panel frame may be used individually, being placed directly on the soil to provide a protective barrier for plants which it surrounds on four sides (two or more panel frames may be stacked upon one another to protect higher growing plants), or it may be cooperatively mounted atop either the base or extension box. The lid may be used individually, e.g., to sift soil, soil additives or compost through a wire mesh panel, or may be placed atop any of the base, extension box or panel frame with the removable panel of the lid in either spaced or essentially sealed relation to the underlying element. In fact, the same sealing relation may be achieved between the base and an extension box or panel frame mounted thereon, and between the extension box and a panel frame mounted thereon by mutual contact of the edges of the side and end walls of the superposed elements. To ensure such contact, the corner posts extend downwardly from the plane of the lower edges of the walls by a distance less than the upper surfaces of the corner posts are spaced below the plane of the upper wall edges, whereby the lower surfaces of the corner posts of an upper element are slightly spaced from the upper surfaces of the corner posts of a lower element.

In addition to the applications already mentioned, some of the other myriad uses include, but are not limited to:

1. Using the base and/or extension box as a germinator by wrapping the lid with black landscaping cloth or other light blocking, heat absorbing material and placing it securely atop the base/extension box;
2. Using the base and/or extension box and/or panel frame, and lid or inverted dolly wrapped with black cloth or other heat absorbing material as a cover, to preheat soil, control moisture, light and pests, before planting, something which is difficult, if not impossible in an ordinary garden;
3. Using the base, extension box, panel frame and lid, with and without fabric liners and wraps, in various combinations as appropriate to the particular plants being grown, to regulate temperature, moisture, light, wind and pests;
4. Using the extension box or base, with or without panel frame/lid, mounted on the dolly as a portable flat to harden off or acclimate seedlings started indoors to the outside environment;
5. Using the panel frame with open screen panels mounted horizontally therein as shelves, as a solar drying or dehydrating device;
6. Since individual components or combinations can be used separately at the same time, one can employ these various configurations to address a variety of planting and growing situations for plants/seeds/soil in the planter, garden or indoors simultaneously (e.g., starting successive flats of cabbage seedlings indoors and hardening them off in the base or extension box, on the dolly, while transplanting the seedlings in the garden surrounded by the panel frame with screens and fabric to keep out cabbage worm moths and, at the same time, using the trellis on the base or extension box to grow early peas; components may then be rearranged for subsequent conditions as the growing and harvesting seasons progress, and adapted (by artificial lighting, etc.) for extended use, even indoors, after the normal growing season.

The foregoing descriptions, suggested structural combinations and discussions of possible uses and applications are by no means intended to be exhaustive. Many modifications, extensions or adaptations of uses, etc. will become apparent to those employing the apparatus. The scope of the invention is defined and limited only by the following claims.

What is claimed is:

1. A planter unit for agricultural/horticultural uses, said unit comprising:
   a) a four-sided box-like body having a pair of opposing side walls and a pair of opposing end walls, open at the top and bottom, said side and end walls meeting at four corners;
   b) four, elongated corner posts extending along parallel axes, a respective one of said corner posts being positioned within said walls at each of said four corners of said body with one of each of said side and end walls affixed to each of said corner posts, said side and end walls having upper and lower edges in common first and second planes, respectively;
   c) said corner posts having upper surfaces in a common, third plane, parallel to and spaced downwardly from said first plane, within said body, and lower surfaces in a common fourth plane, parallel to and spaced downwardly from said second plane, outside said body; and d) at least one clip affixed to a vertical side of each of said corner posts and extending from an upper end within said body, through said fourth plane, laterally adjacent said lower surface, to a lower end below said fourth plane, outside said body;

e) a dolly unit having a flat sheet member with upper and lower surfaces, a plurality of wheel means mounted to said lower surface, and support means connected to said sheet member, at least portions of said support means being positioned outwardly of said sheet member in a plane parallel to and below said sheet member upper surface for placement of at least two of said side and end wall lower edges upon said support means, said sheet member dimensioned to fit closely within and surrounded by said side and end walls and having a rectangular periphery with cut-out corners, the portions of said corner posts extending downwardly below said second plane positioned in said cut-out corners of said sheet member.

2. The planter unit of claim 1 and further including means releasably connecting said body to said dolly, said connecting means including said at least one clip.

3. The planter unit of claim 1 and further including a second of said planter units, and wherein said first and third planes of each of said units are spaced by a distance slightly greater than the distance by which said second and fourth planes are spaced, said second planter unit being placed atop said first planter unit with the lower edges of the side and end walls of the second unit resting upon the upper edges of the side and end walls of the first unit, and the lower surfaces of the corner posts of the second unit slightly above the upper surfaces of the corner posts of the first unit.

4. The planter unit of claim 3 and further including means releasably connecting said first and second planter units to on other.

5. The planter units of claim 4 where said connecting means comprise pins extending through aligned openings in said at least one clip of said second unit and said corner posts of said first unit.

6. The planter unit of claim 1 and further including a pair of support members respectively attached to opposing surfaces of said end walls within said body.

7. The planter unit of claim 6 wherein said support members are substantially identical to one another, each having a pair of parallel, longitudinal edges extending substantially fully between opposing surfaces of a pair of said corner posts.

8. The planter unit of claim 7 and further including means for selectively attaching said support members to said opposing surfaces of said end walls in either of two positions, in one of which one of said longitudinal edges lies substantially in said third plane, thereby being in a common plane with said upper surfaces of said corner posts.

9. The planter unit of claim 6 and further including a trellis structure having a first pair of lower end portions respectively resting upon and at least partially supported by said support members and a second pair of lower end portions spaced from and supported with respect to said first pair of support members, said trellis structure extending upwardly from said body.

10. The planter unit of claim 9 and further including a first pair of pins respectively extending through openings in said first pair of lower end portions and releasably secured to said end walls, and a second pair of pins respectively extending through aligned openings in said second pair of lower end portions and secured to said pair of support members.

11. The planter unit of claim 10 and further including a dolly having support means upon which said body rests and a plurality of wheel means for movement of said dolly with said body and said trellis structure thereon.

12. The planter unit of claim 11 and further including means for releasably connecting said body to said dolly.

13. The planter unit of claim 1 and further including a lid member comprising a four-sided frame defining a rectangular central area, and a panel member slidably inserted in said frame to fill said central area.

14. The planter unit of claim 13 wherein said body includes structure defining a substantially continuous surface in said third plane, said continuous surface including said upper surfaces of said corner posts, said lid member having opposite, first and second sides and being so configured that said first side may be placed upon said continuous surface in substantially uninterrupted contact therewith, thereby effectively forming a seal between said continuous surface and said first side of said lid member.

15. The planter unit of claim 14 wherein said lid member is so configured that a first pair of sides of said frame on said second side may be placed, with said lid member inverted, directly upon said upper edges of said corner posts, in said third plane, with the second pair of sides of said frame and said panel on said second side spaced above said first plane to provide direct communication between the inside and outside of said body.

16. The planter unit of claim 15 wherein said panel member is a sheet of open-mesh screen material.

17. The planter unit of claim 14 wherein said continuous surface includes horizontal surfaces of a first pair of sealing strips extending between said corner posts on opposite sides of said body member and extending inwardly from opposing surfaces of said side walls, and a second pair of sealing strips extending between said corner posts on opposite ends of said body member and extending inwardly from opposing surfaces of said end walls, and further including a pair of spacer bars respectively affixed to and extending inwardly from said end walls on the opposing surfaces thereof, said spacer bars each having a horizontal surface in said first plane and opposing vertical surfaces spaced by a predetermined distance, and wherein the distance between said first surface of said lid member and the surface of said panel member is substantially equal to the distance between said first and third planes and said panel member is wider than said frame, whereby said panel member surface contacts and forms a seal with said upper edges of said side walls in said first plane in addition to said seal between said continuous surface and said first side of said lid member, and said frame includes end members with outwardly facing, vertical surfaces spaced by substantially said predetermined distance, whereby said vertical surfaces of said spacer members and of said frame members contact one another to form an additional seal.

18. The planter unit of claim 1 wherein said corner posts form a first group of corner posts, and further including a panel frame member comprising a second group of four corner posts, a second pair of end walls each affixed to first and second pairs of said second group of corner posts, spacer means releasably affixed to each of said second group of corner posts and maintaining said first and second pairs in spaced relation with said second pair of end walls in parallel, vertical planes, a pair of panel members, and means for removably supporting said panel members to extend between said first and second pairs of said second group of corner posts, said panel frame member being supported atop said body.

19. The planter unit of claim 18 wherein said end walls are sheets of rigid, transparent material.

20. The planter unit of claim 19 wherein said panel members are slidingly insertable into and removable from said support means for selective interchangeability of said panel members.

21. The planter unit of claim 19 further including at least one shelf member within the space defined by said second end walls and said panel members, in a substantially horizontal plane.

22. A planter unit for agricultural/horticultural uses, said unit comprising:
   a) a four-sided, box-like body having a pair of opposing side walls and a pair of opposing end walls, open at the top and bottom, said side and end walls meeting at four corners;
   b) four, elongated comer posts extending along parallel axes, a respective one of said corner posts being positioned within said walls at each of said four corners with one of each of said side and end walls affixed to each of said comer posts, said side and end walls having upper and lower edges in common first and second planes, respectively; and
   c) a pair of substantially identical trellis support members respectively attached to one of said opposing end walls within said body, each of said trellis support members having a pair of substantially parallel, horizontal, longitudinal edges with a notch extending into one of said edges and the other edge being continuously linear.

23. The planter unit of claim 22 and further including means for selectively attaching said support members to said opposing surfaces of said end walls in either of two positions, one with said one of said longitudinal edges uppermost and the other with said other edge uppermost.

24. The planter unit of claim 23 wherein said comer posts have upper surfaces in a common, third plane, and wherein, when said support members are attached to said end walls with said other edge of each uppermost, said other edges lie substantially in said third plane.

25. The planter unit of claim 22 and further including a trellis structure having a first pair of lower end portions respectively resting upon and at least partially supported by said support members and a second pair of lower end portions spaced from and supported with respect to said first pair of support members, said trellis structure extending upwardly from said body.

26. The planter unit of claim 25 and further including a first pair of pins respectively extending through openings in said first pair of lower end portions and releasably secured to said end walls, and a second pair of pins respectively extending through aligned openings in said second pair of lower end portions and secured to said pair of support members.

27. The planter unit of claim 26 and further including a dolly having support means upon which said body rests and a plurality of wheel means for movement of said dolly with said body and said trellis structure thereon.

28. The planter unit of claim 27 and further including means for releasably connecting said body to said dolly.

29. A planter unit for agricultural/horticultural uses, said unit comprising:
   a) a four-sided, box-like body having a pair of opposing side walls and a pair of opposing end walls, open at the top and bottom, said side and end walls meeting at four corners;
   b) four, elongated comer posts extending along parallel axes, a respective one of said comer posts being positioned within said walls at each of said four corners with one of each of said side and end walls affixed to each of said comer posts, said side and end walls having upper and lower edges in common first and second planes, respectively;
   c) said comer posts having upper surfaces in a common, third plane, parallel to and spaced downwardly from said first plane, within said body, and lower surfaces in a common fourth plane, parallel to and spaced downwardly from said second plane, outside said body; and
   d) a lid member comprising a four-sided frame defining a rectangular, central area, and a panel member slidably inserted in said frame to fill said central area, said body including structure defining a substantially continuous surface in said third plane, said continuous surface including said upper surfaces of said comer posts, said lid member having opposite, first and second sides and being so configured that said first side may be placed upon said continuous surface in substantially uninterrupted contact therewith, thereby effectively forming a seal between said continuous surface and said first side of said lid member.

30. The planter unit of claim 29 wherein said lid member is so configured that a first pair of sides of said frame on said second side may be placed, with said lid member inverted, directly upon said supper edges of said comer posts, in said third plane, with the second pair of sides of said frame and said panel on said second side spaced above said first plane to provide direct communication between the inside and outside of said body.

31. The planter unit of claim 29 wherein said continuous surface includes horizontal surfaces of a first pair of sealing strips extending between said comer posts on opposite sides of said body member and extending inwardly from opposing surfaces of said side walls, and a second pair of sealing strips extending between said comer posts on opposite ends of said body member and extending inwardly from opposing surfaces of said end walls, and further including a pair of spacer bars respectively affixed to and extending inwardly from said end walls on the opposing surfaces thereof, said spacer bars each having a horizontal surface in said first plane and opposing vertical surfaces of said lid member and the surface of said panel member is substantially equal to the distance between said first and third planes and said panel member is wider than said frame, whereby said panel member surface contacts and forms a seal with said upper edges of said side walls in said first plane in addition to said seal between said continuous surface and said first side of said lid member, and said frame includes end members with outwardly facing, vertical surfaces spaced by substantially said predetermined distance, whereby said vertical surfaces of said spacer members and of said frame members contact one another to form an additional seal.

32. A planter unit for agricultural/horticultural uses, said unit comprising:
   a) a four-sided, box-like body having a pair of opposing side walls and a pair of opposing end walls, open at the top and bottom, said side and end walls meeting at four corners;
   b) four, elongated comer posts extending along parallel axes, a respective one of said comer posts being positioned within said walls at each of said four corners with one of each of said side and end walls affixed to each of said comer posts, said side and end walls having upper and lower edges in common first and second planes, respectively;
   c) said comer posts having upper surfaces in a common, third plane parallel to and spaced downwardly from said first plane, within said body, and lower surfaces in a common, fourth plane, parallel to and spaced downwardly from said second plane, outside said body; and d) a dolly unit having a flat sheet member with horizontal, upper and lower surfaces and a rectangular periphery with cut-out corners, a plurality of wheel means mounted to said lower surface, at least two, parallel support members mounted to said lower surface and extending outwardly therefrom in a plane below that of said upper surface to terminal ends, said body being placed upon said dolly unit with the portions of said corner posts extending downwardly below said second plane positioned in said cut-out corners of said sheet member, and the lower edges of at least one of said pair of side walls and said pair of end walls resting upon the portions of said support members extending outwardly from said flat sheet, said sheet member periphery being dimensioned to fit closely within and surrounded by said side and end walls and said corner posts.

33. The planter unit of claim 32 wherein two of the edges of said rectangular periphery form front and rear ends of said dolly unit, and wherein said support members extend laterally across said lower surface and outwardly of said sheet member substantially parallel to one another and to said front and rear ends.

34. The planter unit of claim 33 wherein said support members include respective surfaces substantially vertically aligned with portions of said cut-out corners of said rectangular periphery, one of said support members rearwardly of said front end and the other forwardly of said rear end.

35. The planter unit of claim 34 and further including a rope affixed to said terminal ends of at least said one of said support members.

36. The planter unit of claim 35 and further including a pair of ropes respectively affixed to said terminal ends of each of said support members.

* * * * *

UNITED STATES PATENT AND TRADEMARK OFFICE
CERTIFICATE OF CORRECTION

PATENT NO.  : 6,393,764 B1
DATED       : May 28, 2002
INVENTOR(S) : Jeffrey G. Smith It is certified that error appears in the above-identified patent and that said Letters Patent is hereby corrected as shown below:

Column 11,
Line 38, "on" should be -- one --.

Column 12,
Lines 10-11, insert a comma -- , -- between "rectangular" and "central".

Signed and Sealed this

Eighth Day of October, 2002

*Attest:*

*Attesting Officer*

JAMES E. ROGAN
*Director of the United States Patent and Trademark Office*